(12) United States Patent
Bean et al.

(10) Patent No.: US 10,050,980 B2
(45) Date of Patent: Aug. 14, 2018

(54) ENTERPRISE REPUTATIONS FOR UNIFORM RESOURCE LOCATORS

(71) Applicant: McAfee, LLC, Plano, TX (US)

(72) Inventors: James Bean, Portland, OR (US); Joel R. Spurlock, Portland, OR (US); Ramnath Venugopalan, Webster, NY (US)

(73) Assignee: McAfee, LLC, Plano, TX (US)

( * ) Notice: Subject to any disclaimer, the term of this patent is extended or adjusted under 35 U.S.C. 154(b) by 0 days.

(21) Appl. No.: 14/752,909

(22) Filed: Jun. 27, 2015

(65) Prior Publication Data

US 2016/0380977 A1  Dec. 29, 2016

(51) Int. Cl.
  *G06F 21/00* (2013.01)
  *H04L 29/06* (2006.01)

(52) U.S. Cl.
  CPC ........ *H04L 63/1408* (2013.01); *H04L 63/101* (2013.01)

(58) Field of Classification Search
  CPC ..................... H04L 2209/76; H04L 29/06619
  USPC ........................................................ 726/12
  See application file for complete search history.

(56) References Cited

U.S. PATENT DOCUMENTS

| | | | |
|---|---|---|---|
| 5,987,610 A | 11/1999 | Franczek et al. | |
| 6,073,142 A | 6/2000 | Geiger et al. | |
| 6,460,050 B1 | 10/2002 | Pace et al. | |
| 7,506,155 B1 | 3/2009 | Stewart et al. | |
| 8,978,139 B1* | 3/2015 | Banerjee | H04L 63/1416 726/24 |
| 2010/0106557 A1 | 4/2010 | Buss | |
| 2012/0239751 A1 | 9/2012 | Alperovitch et al. | |
| 2013/0061038 A1 | 3/2013 | Pao et al. | |
| 2014/0250112 A1 | 9/2014 | Ghosh et al. | |
| 2015/0052608 A1 | 2/2015 | Sallam | |
| 2015/0237068 A1* | 8/2015 | Sandke | H04L 63/1466 726/23 |
| 2016/0173510 A1* | 6/2016 | Harris | H04L 63/1416 726/23 |

FOREIGN PATENT DOCUMENTS

WO   2017003589   1/2017

OTHER PUBLICATIONS

International Search Report and Written Opinion issued in PCT Application No. PCT/US2016/033987 dated Aug. 8, 2016; 10 pages.

* cited by examiner

*Primary Examiner* — Anthony Brown
(74) *Attorney, Agent, or Firm* — Patent Capital Group

(57) ABSTRACT

There is disclosed in an example a computing apparatus configured to operate as an enterprise threat intelligence server, and including: a network interface configured to communicatively couple to a network; and one or more logic elements providing a reputation engine, operable for: receiving a first uniform resource locator (URL) identifier; determining that a first URL identified by the first URL identifier has an unknown enterprise reputation; and establishing a baseline reputation for the URL. There is further disclosed a method of providing the reputation engine, and one or more computer-readable mediums having stored thereon executable instructions for providing the reputation engine.

25 Claims, 10 Drawing Sheets

ENTERPRISE REPUTATIONS FOR UNIFORM RESOURCE LOCATORS

FIELD OF THE SPECIFICATION

This disclosure relates in general to the field of computer security, and more particularly, though not exclusively to, a system and method for assigning enterprise-level reputations for uniform resource locators.

BACKGROUND

A uniform resource locator (URL) is a unique identifier for accessing a network resource, such as a website. In general practice, a URL has two parts: a scheme and an address. These may be separated by a colon and two forward slashes. For example, the URL "http://www.uspto.gov" includes the scheme "http," meaning that the resource is accessed via the hypertext transfer protocol (HTTP). The resource is the subdomain "www" on the domain "uspto" within the "gov" top-level domain (TLD), which is reserved primarily for U.S. government agencies.

URLs may also include a path within the domain or subdomain. For example, the URL http://www.uspto.gov/patents-application-process/file-online points to the path "patents-application-process/file-online on the www.uspto.gov server.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

FIG. 1b is a block diagram illustrating additional details of the network of FIG. 1a.

SUMMARY

Figure 1A:
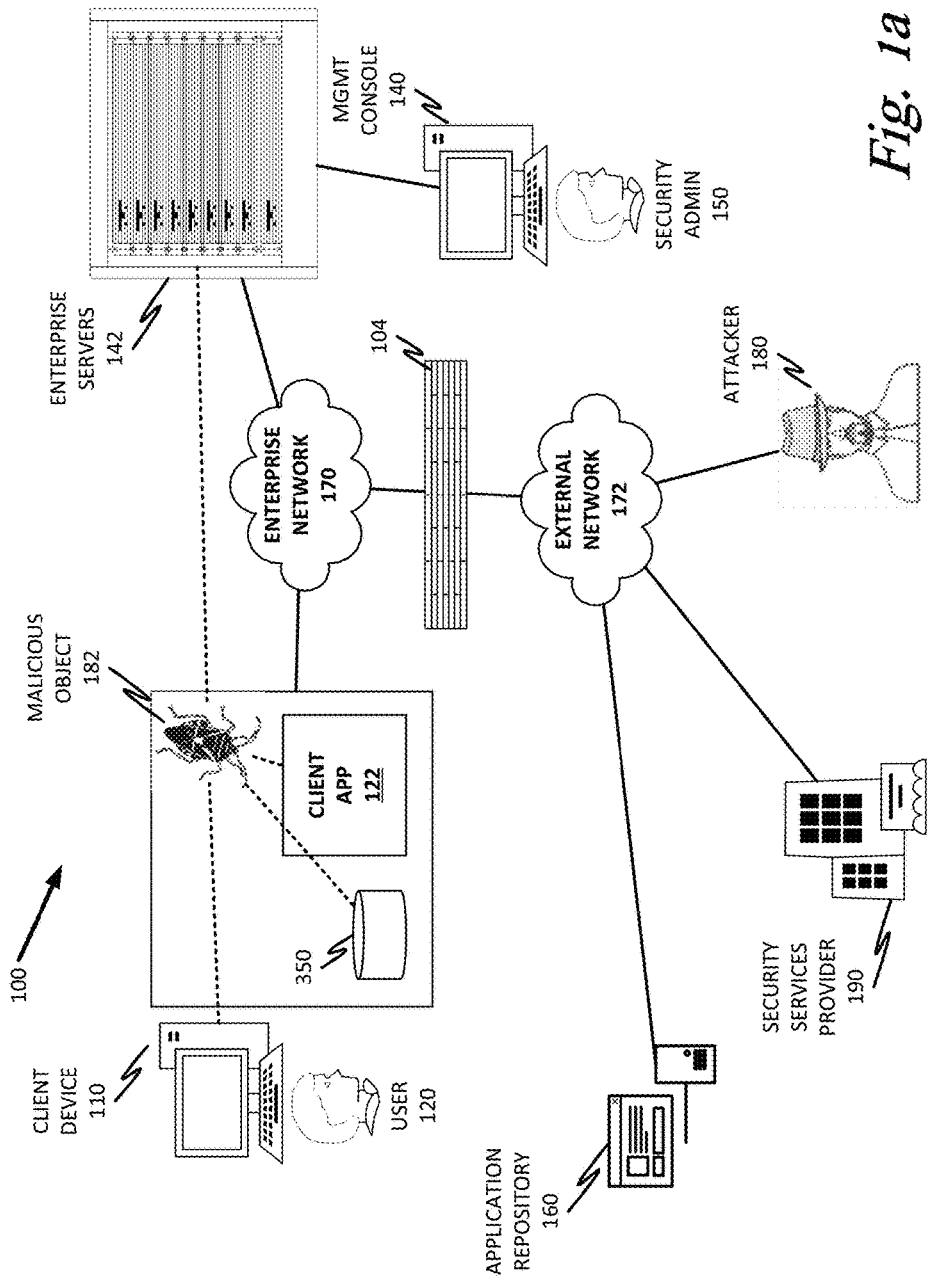
FIG. 1a is a block diagram of a security-enabled network according to one or more examples of the present specification.

There is disclosed in an example a computing apparatus configured to operate as an enterprise threat intelligence server, and including: a network interface configured to communicatively couple to a network; and one or more logic elements providing a reputation engine, operable for: receiving a first uniform resource locator (URL) identifier; determining that a first URL identified by the first URL identifier has an unknown enterprise reputation; and establishing a baseline reputation for the URL. There is further disclosed a method of providing the reputation engine, and one or more computer-readable mediums having stored thereon executable instructions for providing the reputation engine.

Embodiments of the Disclosure

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments many have different advantages, and no particular advantage is necessarily required of any embodiment.

The named inventors herein have recognized that enterprise security is an ever-evolving architecture that must adapt to address new threats and vulnerabilities. In certain existing models, enterprises encounter various "security objects" (as described in more detail below). As a network device encounters an object, a client security agent may request a reputation for the object, and act appropriately, including taking remedial action as necessary.

Object reputations may, as a first line of defense, come from a global security services provider, such as McAfee, Inc. The security services provider may operate a global threat intelligence server (GTIS) 192 to provide a global threat intelligence service, which compiles and characterizes a large database of security objects, assigning each a reputation based on what is known about it.

In an example GTIS 192 may handle external internet based requests and merge the data sources/logging with ETIS 146 in a scalable and latency friendly manner However, not every object has the same impact on every enterprise. An object that is benign or beneficial to one enterprise may be harmful to another. To provide just one example, when the "enterprise" is a home network, online games may be benign. But to a for-profit enterprise, the same online games may be restricted by network policy to avoid time wasting.

Thus, the enterprise itself may also operate an enterprise threat intelligence server (ETIS) 146 to provide an enterprise threat intelligence service. ETIS 146 may be configured by an administrator 150 to handle specific network conditions for protected enterprise 100.

In an example, ETIS 146 is specifically configured to provide URL reputations. This may extend and expand on the GTIS "cloud"-based reputation and URL categories beyond the traditional usage of querying a reputation and returning a response. The additional functionality may include the following, by way of nonlimiting example:

a. Reducing the cost of querying the cloud through a "proxying" function within ETIS 146.
    b. Setting administrator overrides to identify URLs and domains that are either trusted or malicious.
    c. Indicator of compromise (IoC) support.
    d. Improved client protection for file based execution that is linked to URLs.

e. Improved telemetry metadata sent to the cloud allowing building support in GTIS 192 for grey list management for URLs.

f. Providing support to enhanced algorithms for blocking URLs or preventing false positives.

g. Normalization of URL reputation into an existing ETIS reputation format (e.g., 0-100) to ensure consistency.

In an example, ETIS 146 stores both URL reputation and category values, as well as allowing those to be administratively overridden.

In an example, ETIS 146 queries GTIS 192 for a URL reputation. However, additional functionality is expected to be enabled as TIE administrators may choose to override specific URL reputations, use third party feeds or may integrate with other products. The order of precedence in terms of determining which source of URL reputation information should be valued first may also be considered.

GTIS 192 or ETIS 146 may also provide external reputation refreshes. For example, unknown or non-deterministic reputations may be refreshed periodically on ETIS 146. The intervals and timescales can change depending on the classification or prevalence for example. This provides potential threat events for historical activity. An optimization may include a domain level check in which the domain may have a malicious URL marker to notify the requesting entity that one or more bad URLs are associated with an otherwise benign domain. ETIS 146 may cache domain level markers, thus eliminating superfluous refreshes, where there is no relevant URL reputation associated to a domain. This could also be an optimization at initial analysis time. If it is know that there is no untrusted or "bad" URL for a domain, the system may asynchronously collect the URLs from the session and send them in a single bulk transaction. This may help to improve latencies and overall performance for endpoints, servers, and cloud services.

A system and method according to the present specification will now be described with more particular reference to the attached figures. Throughout the figures, common labels are intended to refer to common or similar elements, though this is not intended to imply a particular relationship between the various views and figures. In some instances, a hyphenated label (such as 10-2 or 10-2) may be used to refer to an example or species of a generic element 10.

FIG. 1A is a network-level diagram of a secured enterprise 100 according to one or more examples of the present specification. In the example of FIG. 1A, one or more users 120 operate one or more client devices 110. Each device may include an appropriate operating system, such as Microsoft Windows, Linux, Android, Mac OSX, Apple iOS, Unix, or similar. Some of the foregoing may be more often used on one type of device than another. For example, desktop computers or engineering workstation may be more likely to use one of Microsoft Windows, Linux, Unix, or Mac OSX. Laptop computers, which are usually a portable off-the-shelf device with fewer customization options, may be more likely to run Microsoft Windows or Mac OSX. Mobile devices may be more likely to run Android or iOS. However, these examples are not intended to be limiting.

Client devices 110 may be communicatively coupled to one another and to other network resources via enterprise network 170. Enterprise network 170 may be any suitable network or combination of one or more networks operating on one or more suitable networking protocols, including for example, a local area network, an intranet, a virtual network, a wide area network, a wireless network, a cellular network, or the Internet (optionally accessed via a proxy, virtual machine, or other similar security mechanism) by way of nonlimiting example. Enterprise network 170 may also include one or more servers, firewalls, routers, switches, security appliances, antivirus servers, or other useful network devices, which in an example may be virtualized within enterprise servers 142. In this illustration, enterprise network 170 is shown as a single network for simplicity, but in some embodiments, enterprise network 170 may include a large number of networks, such as one or more enterprise intranets connected to the internet. Enterprise network 170 may also provide access to an external network, such as the Internet, via external network 172. External network 172 may similarly be any suitable type of network.

Enterprise servers 142 may be provided, for example as a virtual cluster running in a hypervisor on a plurality of rack-mounted blade servers, or as a cluster of physical servers. Enterprise servers 142 may provide one or more server functions, or one or more "microclouds" in one or more hypervisors. For example, a virtualization environment such as vCenter may provide the ability to define a plurality of "tenants," with each tenant being functionally separate from each other tenant, and each tenant operating as a single-purpose microcloud. Each microcloud may serve a distinctive function, and may include a plurality of virtual machines (VMs) of many different flavors, including agentful and agentless VMs. It should also be noted that some functionality of endpoint devices 120 may also be provided via enterprise servers 142. For example, one microcloud may provide a remote desktop hypervisor such as a Citrix workspace, which allows users 120 operating endpoints 120 to remotely login to a remote enterprise desktop and access enterprise applications, workspaces, and data. In that case, endpoint 120 could be a "thin client" such as a Google Chromebook, running only a stripped-down operating system, and still provide user 120 useful access to enterprise resources.

One or more computing devices configured as a management console 140 may also operate on enterprise network 170. Management console 140 may provide a user interface for a security administrator 150 to define enterprise security policies, which management console 140 may enforce on enterprise network 170 and across client devices 110 and enterprise servers 142. In an example, management console 140 may run a server-class operating system, such as Linux, Unix, or Windows Server. In other case, management console 140 may be provided as a web interface, on a desktop-class machine, or via a VM provisioned within enterprise servers 142.

Secured enterprise 100 may encounter a variety of "security objects" on the network. A security object may be any object that operates on or interacts with enterprise network 170 and that has actual or potential security implications. In one example, security objects may be broadly divided into hardware objects, including any physical device that communicates with or operates via the network, and software objects. Software objects may be further subdivided as "executable objects" and "static objects." Executable objects include any object that can actively execute code or operate autonomously, such as applications, drivers, programs, executables, libraries, processes, runtimes, scripts, macros, binaries, interpreters, interpreted language files, configuration files with inline code, embedded code, and firmware instructions by way of non-limiting example. A static object may be broadly designated as any object that is not an executable object or that cannot execute, such as documents, pictures, music files, text files, configuration files without inline code, videos, and drawings by way of non-limiting example. In some cases, hybrid software objects may also be provided, such as for example a word processing document with built-in macros or an animation with inline code. For security purposes, these may be considered as a separate class of software object, or may simply be treated as executable objects.

Secured enterprise 100 may communicate across enterprise boundary 104 with external network 172. Enterprise boundary 104 may represent a physical, logical, or other boundary. External network 172 may include, for example, websites, servers, network protocols, and other network-based services. In one example, an application repository 160 is available via external network 172, and an attacker 180 (or other similar malicious or negligent actor) also connects to external network 172. A security services provider 190 may provide services to secured enterprise 100.

It may be a goal of users 120 and secure enterprise 100 to successfully operate client devices 110 and enterprise servers 142 without interference from attacker 180 or from unwanted security objects. In one example, attacker 180 is a malware author whose goal or purpose is to cause malicious harm or mischief, for example by injecting malicious object 182 into client device 110. Once malicious object 182 gains access to client device 110, it may try to perform work such as social engineering of user 120, a hardware-based attack on client device 110, modifying storage 350 (FIG. 3), modifying client application 122 (which may be running in memory), or gaining access to enterprise servers 142.

The malicious harm or mischief may take the form of installing root kits or other malware on client devices 110 to tamper with the system, installing spyware or adware to collect personal and commercial data, defacing websites, operating a botnet such as a spam server, or simply to annoy and harass users 120. Thus, one aim of attacker 180 may be to install his malware on one or more client devices 110. As used throughout this specification, malicious software ("malware") includes any security object configured to provide unwanted results or do unwanted work. In many cases, malware objects will be executable objects, including by way of non-limiting examples, viruses, trojans, zombies, rootkits, backdoors, worms, spyware, adware, ransomware, dialers, payloads, malicious browser helper objects, tracking cookies, loggers, or similar objects designed to take a potentially-unwanted action, including by way of non-limiting example data destruction, covert data collection, browser hijacking, network proxy or redirection, covert tracking, data logging, keylogging, excessive or deliberate barriers to removal, contact harvesting, and unauthorized self-propagation.

Attacker 180 may also want to commit industrial or other espionage against secured enterprise 100, such as stealing classified or proprietary data, stealing identities, or gaining unauthorized access to enterprise resources. Thus, attacker 180's strategy may also include trying to gain physical access to one or more client devices 110 and operating them without authorization, so that an effective security policy may also include provisions for preventing such access.

In another example, a software developer may not explicitly have malicious intent, but may develop software that poses a security risk. For example, a well-known and often-exploited security flaw is the so-called buffer overrun, in which a malicious user is able to enter an overlong string into an input form and thus gain the ability to execute arbitrary instructions or operate with elevated privileges on a computing device. Buffer overruns may be the result, for example, of poor input validation or use of insecure libraries, and in many cases arise in nonobvious contexts. Thus, although not malicious himself, a developer contributing software to application repository 160 may inadvertently provide attack vectors for attacker 180. Poorly-written applications may also cause inherent problems, such as crashes, data loss, or other undesirable behavior. Because such software may be desirable itself, it may be beneficial for developers to occasionally provide updates or patches that repair vulnerabilities as they become known. However, from a security perspective, these updates and patches are essentially new objects that must themselves be validated.

Application repository 160 may represent a Windows or Apple "app store" or update service, a Unix-like repository or ports collection, or other network service providing users 120 the ability to interactively or automatically download and install applications on client devices 110. If application repository 160 has security measures in place that make it difficult for attacker 180 to distribute overtly malicious software, attacker 180 may instead stealthily insert vulnerabilities into apparently-beneficial applications.

In some cases, secured enterprise 100 may provide policy directives that restrict the types of applications that can be installed from application repository 160. Thus, application repository 160 may include software that is not negligently developed and is not malware, but that is nevertheless against policy. For example, some enterprises restrict installation of entertainment software like media players and games. Thus, even a secure media player or game may be unsuitable for an enterprise computer. Security administrator 150 may be responsible for distributing a computing policy consistent with such restrictions and enforcing it on client devices 110.

Secured enterprise 100 may also contract with or subscribe to a security services provider 190, which may provide security services, updates, antivirus definitions, patches, products, and services. McAfee®, Inc. is a non-limiting example of such a security services provider that offers comprehensive security and antivirus solutions. In some cases, security services provider 190 may include a threat intelligence capability such as the global threat intelligence (GTI™) database provided by McAfee Inc. Security services provider 190 may update its threat intelligence database by analyzing new candidate malicious objects as they appear on client networks and characterizing them as malicious or benign.

In another example, secured enterprise 100 may simply be a family, with parents assuming the role of security administrator 150. The parents may wish to protect their children from undesirable content, such as pornography, adware, spyware, age-inappropriate content, advocacy for certain political, religious, or social movements, or forums for discussing illegal or dangerous activities, by way of non-limiting example. In this case, the parent may perform some or all of the duties of security administrator 150.

When a new object is first encountered on the network, security policies may initially treat it as "gray" or "suspect." As a first line of defense, a security appliance in cluster 142 may query security services provider 190 to see if the new object has a globally-recognized reputation. If so, a local reputation may be generated based on that global reputation. If not, the object is completely new and may be treated as a "candidate malicious object," meaning that its status is unknown, and it may therefore be a malicious object. At a minimum, the new object may be proscribed in its access to protected resources until its reputation can be established. This may mean that extra permission from a user 120 or security administrator 150 is required for the candidate malicious object to access protected resources.

The candidate malicious object may also be subjected to additional rigorous security analysis, particularly if it is a new object with no global reputation, or if it is an executable object. This may include, for example, submitting the object to an internal security audit, or to security services provider 190, for deep analysis. This may include running the object in a sandbox environment, expert status analysis, or other security techniques. These may help to establish a new reputation for the object.

If the object is permitted to operate on the network and malicious behavior is observed, the object may be tagged as malicious object 182. Remedial action may then be taken as appropriate or necessary. Thus, it is a goal of users 120 and security administrator 150 to configure and operate client devices 110, enterprise servers 142, and enterprise network 170 so as to exclude all malicious objects, and to promptly and accurately classify candidate malicious objects.

Figure 1B:
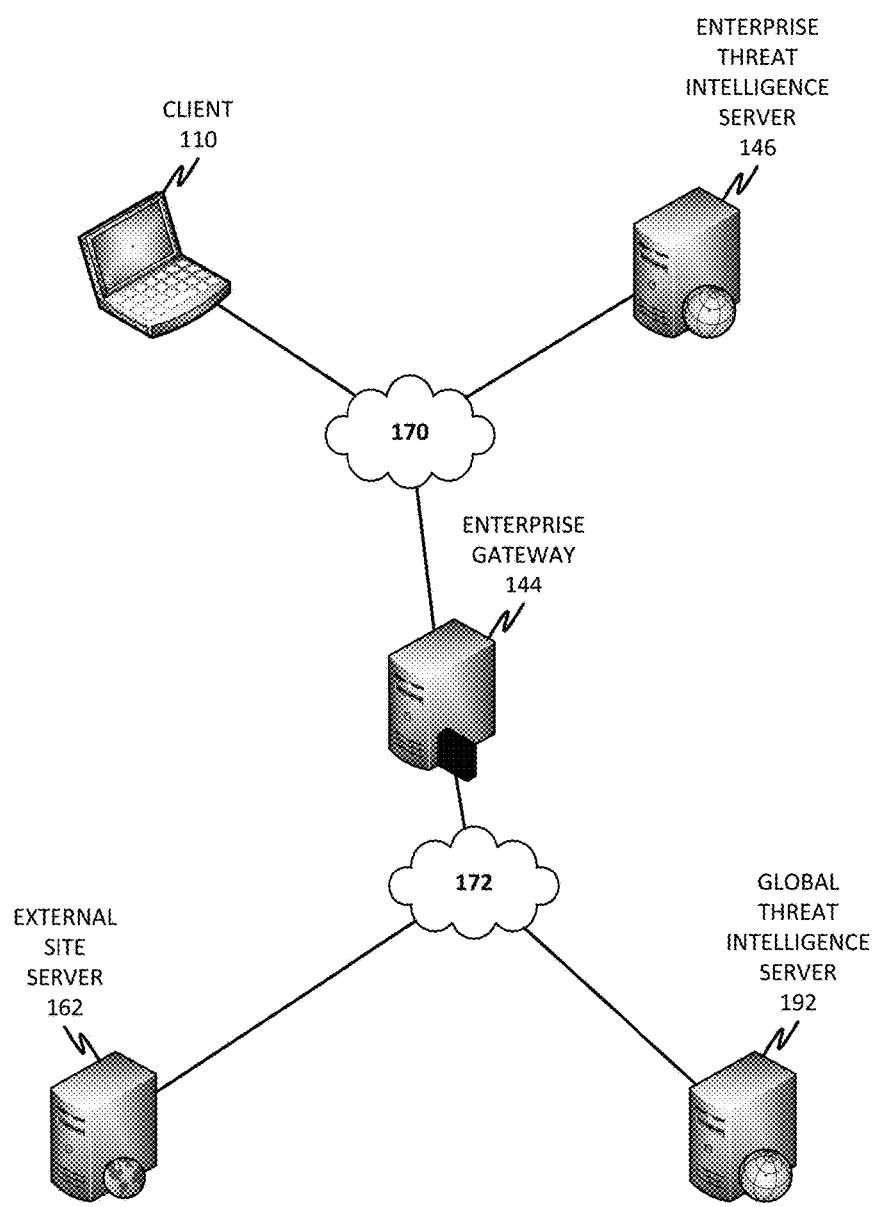

FIG. 1B illustrates additional details of the network of FIG. 1A. In FIG. 1B, several devices are illustrated performing discrete functions. It should be understood, however, that these are logical functions, and are not intended to require a particular physical configuration or network layout. In various embodiments, a single physical device may provide multiple logical functions, while in the same or different embodiments, a logical function may be split between multiple physical devices. It should also be understood that one or more of the functions described herein may be provided by a single-purpose appliance, or by a virtual appliance operating on enterprise servers 142.

In this example, enterprise network 170 is managed by an enterprise gateway 144 (EGW), which provides gateway services for devices, such as client devices 110, connected to enterprise network 170. Enterprise devices communicatively couple to external devices via external network 172, which may be the Internet.

In an example, client device 110 requests a URL, such as by a user 120 operating a web browser. This request traverses enterprise network 170, and is sent out to external network 172 to external site server 162, which in this example hosts the requested URL.

As described in more detail in connection with FIGS. 5A and 5B, EGW 144 checks to see if it has a cached reputation for the URL. If it has an existing cached reputation, then it may make appropriate decisions about what to do with the request based on the reputation. For example, if the reputation is "trusted," the request is allowed. If the reputation is "untrusted," the request may be blocked. If the reputation is "gray," then additional action may be necessary.

If EGW 144 does not have a valid cached reputation for the URL, then it may request a reputation from enterprise threat intelligence server (ETIS) 146. ETIS 146 may be configured with appropriate rules for analyzing URLs and assigning appropriate reputations.

Figure 2:
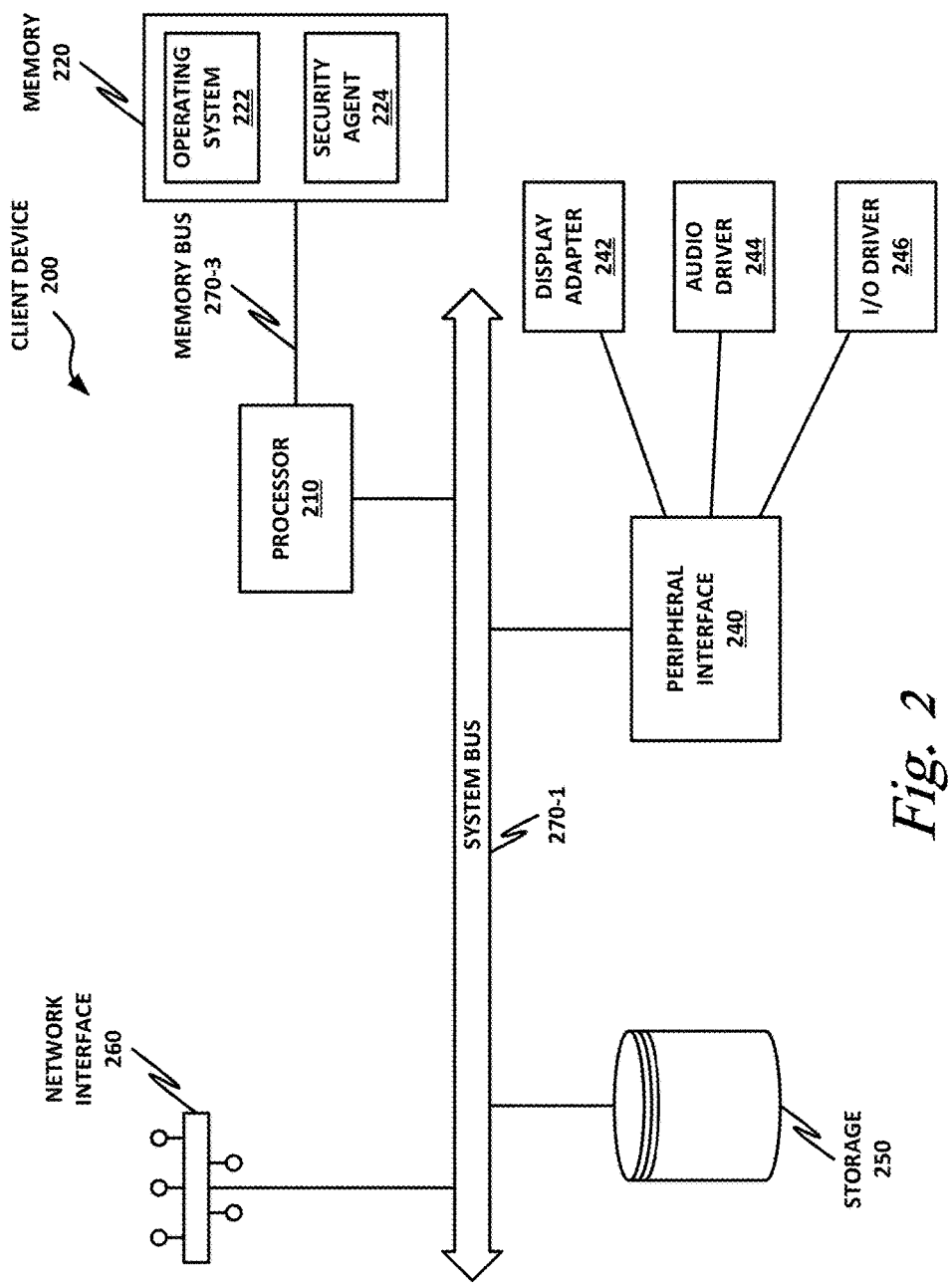
FIG. 2 is a block diagram of a client device according to one or more examples of the present specification.

FIG. 2 is a block diagram of client device 200 according to one or more examples of the present specification. Computing device 200 may be any suitable computing device. In various embodiments, a "computing device" may be or comprise, by way of non-limiting example, a computer, workstation, server, mainframe, virtual machine (whether emulated or on a "bare-metal" hypervisor), embedded computer, embedded controller, embedded sensor, personal digital assistant, laptop computer, cellular telephone, IP telephone, smart phone, tablet computer, convertible tablet computer, computing appliance, network appliance, receiver, wearable computer, handheld calculator, or any other electronic, microelectronic, or microelectromechanical device for processing and communicating data. Any computing device may be designated as a host on the network. Each computing device may refer to itself as a "local host," while any computing device external to it may be designated as a "remote host."

In certain embodiments, client devices 110 may all be examples of computing devices 200.

Computing device 200 includes a processor 210 connected to a memory 220, having stored therein executable instructions for providing an operating system 222 and at least software portions of a security agent 224. Other components of client device 200 include a storage 250, network interface 260, and peripheral interface 240. This architecture is provided by way of example only, and is intended to be non-exclusive and non-limiting. Furthermore, the various parts disclosed are intended to be logical divisions only, and need not necessarily represent physically separate hardware and/or software components. Certain computing devices provide main memory 220 and storage 250, for example, in a single physical memory device, and in other cases, memory 220 and/or storage 250 are functionally distributed across many physical devices. In the case of virtual machines or hypervisors, all or part of a function may be provided in the form of software or firmware running over a virtualization layer to provide the disclosed logical function. In other examples, a device such as a network interface 260 may provide only the minimum hardware interfaces necessary to perform its logical operation, and may rely on a software driver to provide additional necessary logic. Thus, each logical block disclosed herein is broadly intended to include one or more logic elements configured and operable for providing the disclosed logical operation of that block. As used throughout this specification, "logic elements" may include hardware, external hardware (digital, analog, or mixed-signal), software, reciprocating software, services, drivers, interfaces, components, modules, algorithms, sensors, components, firmware, microcode, programmable logic, or objects that can coordinate to achieve a logical operation.

In an example, processor 210 is communicatively coupled to memory 220 via memory bus 270-3, which may be for example a direct memory access (DMA) bus by way of example, though other memory architectures are possible, including ones in which memory 220 communicates with processor 210 via system bus 270-1 or some other bus. Processor 210 may be communicatively coupled to other devices via a system bus 270-1. As used throughout this specification, a "bus" includes any wired or wireless interconnection line, network, connection, bundle, single bus, multiple buses, crossbar network, single-stage network, multistage network or other conduction medium operable to carry data, signals, or power between parts of a computing device, or between computing devices. It should be noted that these uses are disclosed by way of non-limiting example only, and that some embodiments may omit one or more of the foregoing buses, while others may employ additional or different buses.

In various examples, a "processor" may include any combination of logic elements operable to execute instructions, whether loaded from memory, or implemented directly in hardware, including by way of non-limiting example a microprocessor, digital signal processor, field-programmable gate array, graphics processing unit, programmable logic array, application-specific integrated circuit, or virtual machine processor. In certain architectures, a multi-core processor may be provided, in which case processor 210 may be treated as only one core of a multi-core processor, or may be treated as the entire multi-core processor, as appropriate. In some embodiments, one or more co-processor may also be provided for specialized or support functions.

Processor 210 may be connected to memory 220 in a DMA configuration via DMA bus 270-3. To simplify this disclosure, memory 220 is disclosed as a single logical block, but in a physical embodiment may include one or more blocks of any suitable volatile or non-volatile memory technology or technologies, including for example DDR RAM, SRAM, DRAM, cache, L1 or L2 memory, on-chip memory, registers, flash, ROM, optical media, virtual memory regions, magnetic or tape memory, or similar. In certain embodiments, memory 220 may comprise a relatively low-latency volatile main memory, while storage 250 may comprise a relatively higher-latency non-volatile memory. However, memory 220 and storage 250 need not be physically separate devices, and in some examples may represent simply a logical separation of function. It should also be noted that although DMA is disclosed by way of non-limiting example, DMA is not the only protocol consistent with this specification, and that other memory architectures are available.

Storage 250 may be any species of memory 220, or may be a separate device. Storage 250 may include one or more non-transitory computer-readable mediums, including by way of non-limiting example, a hard drive, solid-state drive, external storage, redundant array of independent disks (RAID), network-attached storage, optical storage, tape drive, backup system, cloud storage, or any combination of the foregoing. Storage 250 may be, or may include therein, a database or databases or data stored in other configurations, and may include a stored copy of operational software such as operating system 222 and software portions of security agent 224. Many other configurations are also possible, and are intended to be encompassed within the broad scope of this specification.

Network interface 260 may be provided to communicatively couple client device 200 to a wired or wireless network. A "network," as used throughout this specification, may include any communicative platform operable to exchange data or information within or between computing devices, including by way of non-limiting example, an ad-hoc local network, an internet architecture providing computing devices with the ability to electronically interact, a plain old telephone system (POTS), which computing devices could use to perform transactions in which they may be assisted by human operators or in which they may manually key data into a telephone or other suitable electronic equipment, any packet data network (PDN) offering a communications interface or exchange between any two nodes in a system, or any local area network (LAN), metropolitan area network (MAN), wide area network (WAN), wireless local area network (WLAN), virtual private network (VPN), intranet, or any other appropriate architecture or system that facilitates communications in a network or telephonic environment.

Security agent 224, in one example, is operable to carry out computer-implemented methods as described in this specification. Security agent 224 may include one or more tangible non-transitory computer-readable mediums having stored thereon executable instructions operable to instruct a processor to provide a security agent 224. As used throughout this specification, an "engine" includes any combination of one or more logic elements, of similar or dissimilar species, operable for and configured to perform one or more methods provided by the engine. Thus, security agent 224 may comprise one or more logic elements configured to provide methods as disclosed in this specification. In some cases, security agent 224 may include a special integrated circuit designed to carry out a method or a part thereof, and may also include software instructions operable to instruct a processor to perform the method. In some cases, security agent 224 may run as a "daemon" process. A "daemon" may include any program or series of executable instructions, whether implemented in hardware, software, firmware, or any combination thereof, that runs as a background process, a terminate-and-stay-resident program, a service, system extension, control panel, bootup procedure, BIOS subroutine, or any similar program that operates without direct user interaction. In certain embodiments, daemon processes may run with elevated privileges in a "driver space," or in ring 0, 1, or 2 in a protection ring architecture. It should also be noted that security agent 224 may also include other hardware and software, including configuration files, registry entries, and interactive or user-mode software by way of non-limiting example.

In one example, security agent 224 includes executable instructions stored on a non-transitory medium operable to perform a method according to this specification. At an appropriate time, such as upon booting client device 200 or upon a command from operating system 222 or a user 120, processor 210 may retrieve a copy of the instructions from storage 250 and load it into memory 220. Processor 210 may then iteratively execute the instructions of security agent 224 to provide the desired method.

Security agent 224 may be adapted to provide security services for client devices 200. This may include antivirus, antimalware, and other similar services consistent with this specification. These may further include enforcing URL reputation policies for enterprise 100. For example, when client device 200 encounters a URL, or when a user attempts to download a file from a URL, security agent 224 may take appropriate action to allow or block the attempt. In some cases, security agent 224 may need to request a reputation for the URL before acting. In other cases, enforcement is decentralized. For example, when client device 200 attempts to access a URL, the request may necessarily pass through EGW 144, which enforces the policy at its end.

In some embodiments security agent 224 requests a reputation whenever it encounters a new object, such as a URL. The response may include a reputation, as well as a TTL. Client device 200 may then cache the reputation until the TTL expires, at which case it purges the stale reputation. In other embodiments, an enterprise service bus (ESB), such as McAfee's data exchange layer (DXL) may be provided with a publish-subscribe framework. In that case, client device 200 may subscribe to reputation updates on the ESB, and may cache reputations as they are published.

Peripheral interface 240 may be configured to interface with any auxiliary device that connects to client device 200 but that is not necessarily a part of the core architecture of client device 200. A peripheral may be operable to provide extended functionality to client device 200, and may or may not be wholly dependent on client device 200. In some cases, a peripheral may be a computing device in its own right. Peripherals may include input and output devices such as displays, terminals, printers, keyboards, mice, modems, data ports (e.g., serial, parallel, USB, Firewire, or similar), network controllers, optical media, external storage, sensors, transducers, actuators, controllers, data acquisition buses, cameras, microphones, speakers, or external storage by way of non-limiting example.

In one example, peripherals include display adapter 242, audio driver 244, and input/output (I/O) driver 246. Display adapter 242 may be configured to provide a human-readable visual output, such as a command-line interface (CLI) or graphical desktop such as Microsoft Windows, Apple OSX desktop, or a Unix/Linux X Window System-based desktop. Display adapter 242 may provide output in any suitable format, such as a coaxial output, composite video, component video, VGA, or digial outputs such as DVI or HDMI, by way of nonlimiting example. In some examples, display adapter 242 may include a hardware graphics card, which may have its own memory and its own graphics processing unit (GPU). Audio driver 244 may provide an interface for audible sounds, and may include in some examples a hardware sound card. Sound output may be provided in analog (such as a 3.5 mm stereo jack), component ("RCA") stereo, or in a digital audio format such as S/PDIF, AES3, AES47, HDMI, USB, Bluetooth or Wi-Fi audio, by way of non-limiting example.

Figure 3:
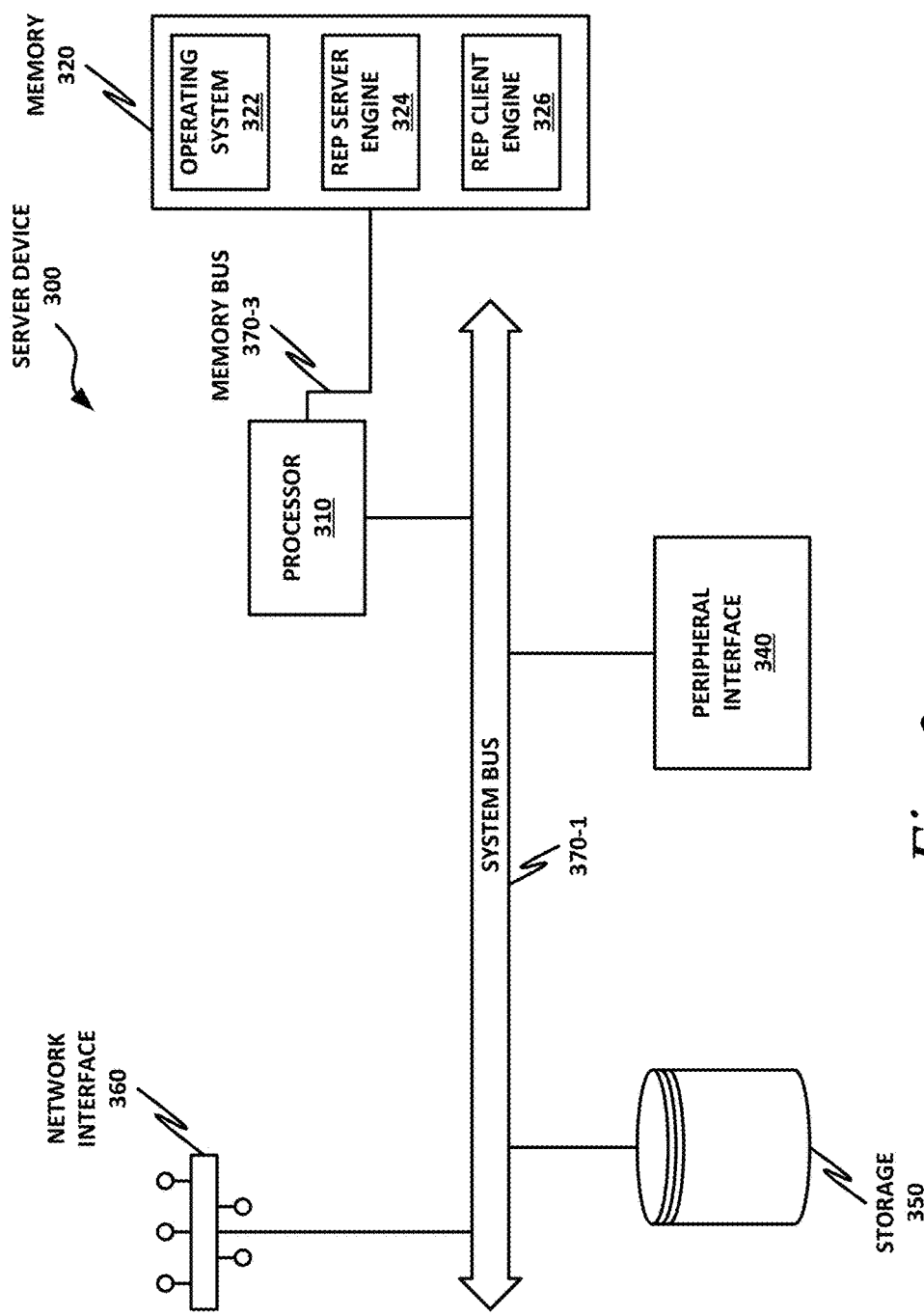
FIG. 3 is a block diagram of a server device according to one or more examples of the present specification.

FIG. 3 is a block diagram of a server-class device 300 according to one or more examples of the present specification. Server 300 may be any suitable computing device, as described in connection with FIG. 2. In general, the definitions and examples of FIG. 2 may be considered as equally applicable to FIG. 3, unless specifically stated otherwise. Server 300 is described herein separately to illustrate that in certain embodiments, logical operations according to this specification may be divided along a client-server model, wherein client device 200 provides certain localized tasks, while server 300 provides certain other centralized tasks. In contemporary practice, server 300 is more likely than client device 200 to be provided as a "headless" VM running on a computing cluster, or as a standalone appliance, though these configurations are not required.

Server 300 includes a processor 310 connected to a memory 320, having stored therein executable instructions for providing an operating system 322 and at least software portions of a reputation server engine 324. Other components of server 300 include a storage 350, network interface 360, and peripheral interface 340. As described in FIG. 2, each logical block may be provided by one or more similar or dissimilar logic elements.

In an example, processor 310 is communicatively coupled to memory 320 via memory bus 370-3, which may be for example a direct memory access (DMA) bus. Processor 310 may be communicatively coupled to other devices via a system bus 370-1.

Processor 310 may be connected to memory 320 in a DMA configuration via DMA bus 370-3, or via any other suitable memory configuration. As discussed in FIG. 2, memory 320 may include one or more logic elements of any suitable type.

Storage 350 may be any species of memory 320, or may be a separate device, as described in connection with storage 250 of FIG. 2. Storage 350 may be, or may include therein, a database or databases or data stored in other configurations, and may include a stored copy of operational software such as operating system 322 and software portions of reputation server engine 324.

Network interface 360 may be provided to communicatively couple server 140 to a wired or wireless network, and may include one or more logic elements as described in FIG. 2.

Reputation server engine 324 is an engine as described in FIG. 2 and, in one example, includes one or more logic elements operable to carry out computer-implemented methods as described in this specification. Software portions of reputation server engine 324 may run as a daemon process.

Reputation server engine 324 may include one or more non-transitory computer-readable mediums having stored thereon executable instructions operable to instruct a processor to provide a security agent. At an appropriate time, such as upon booting server 140 or upon a command from operating system 322 or a user 120 or security administrator 150, processor 310 may retrieve a copy of reputation server engine 324 (or software portions thereof) from storage 350 and load it into memory 320. Processor 310 may then iteratively execute the instructions of reputation server engine 324 to provide the desired method.

Peripheral interface 340 may be configured to interface with any auxiliary device that connects to server 300 but that is not necessarily a part of the core architecture of server 300. Peripherals may include, by way of non-limiting examples, any of the peripherals disclosed in FIG. 2. In some cases, server 300 may include fewer peripherals than client device 200, reflecting that it may be more focused on providing processing services rather than interfacing directly with users. In one example, reputation server engine 324 is provided within or as a function of ETIS 146.

A reputation client engine 326 may also be provided. Reputation client engine 326 is an engine as described in this specification, and the description of reputation server engine 324 is, where relevant, equally applicable to reputation client engine 326. In an example, reputation client engine 326 is provided within or as a function of EGW 144.

Figure 4:
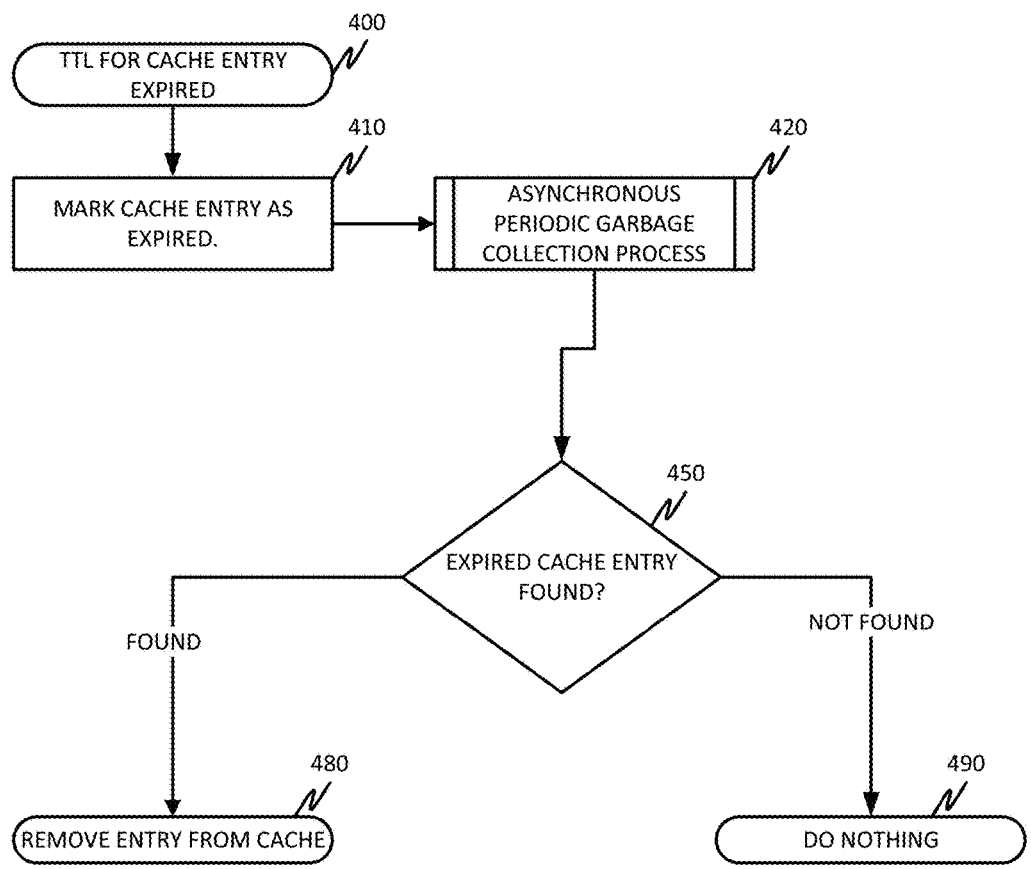
FIG. 4 is a flow chart of a generic cache expiry workflow according to one or more examples of the present specification.

FIG. 4 is a flowchart of a generic method for handling reputation expiry, particularly as it relates to cached entries. Specifically, EGW 144 may retain cached reputations for URLs it encounters. Similarly, ETIS 146 may also cache reputations rather than querying GTIS 192 for each URL that it encounters. Cached entries may have a built-in expiry so that they do not become stale.

In block 400, a time to live (TTL) for a cache entry expires.

In block 410, the entry is marked as expired.

In block 420, an asynchronous periodic garbage collection process scans reputation tables for expired entries.

In block 450, if expired entries are found, then in block 480, those entries are removed from cache. If no expired cache entries are found, then in block 490 there is nothing to do, and the process terminates.

Figure 5A:
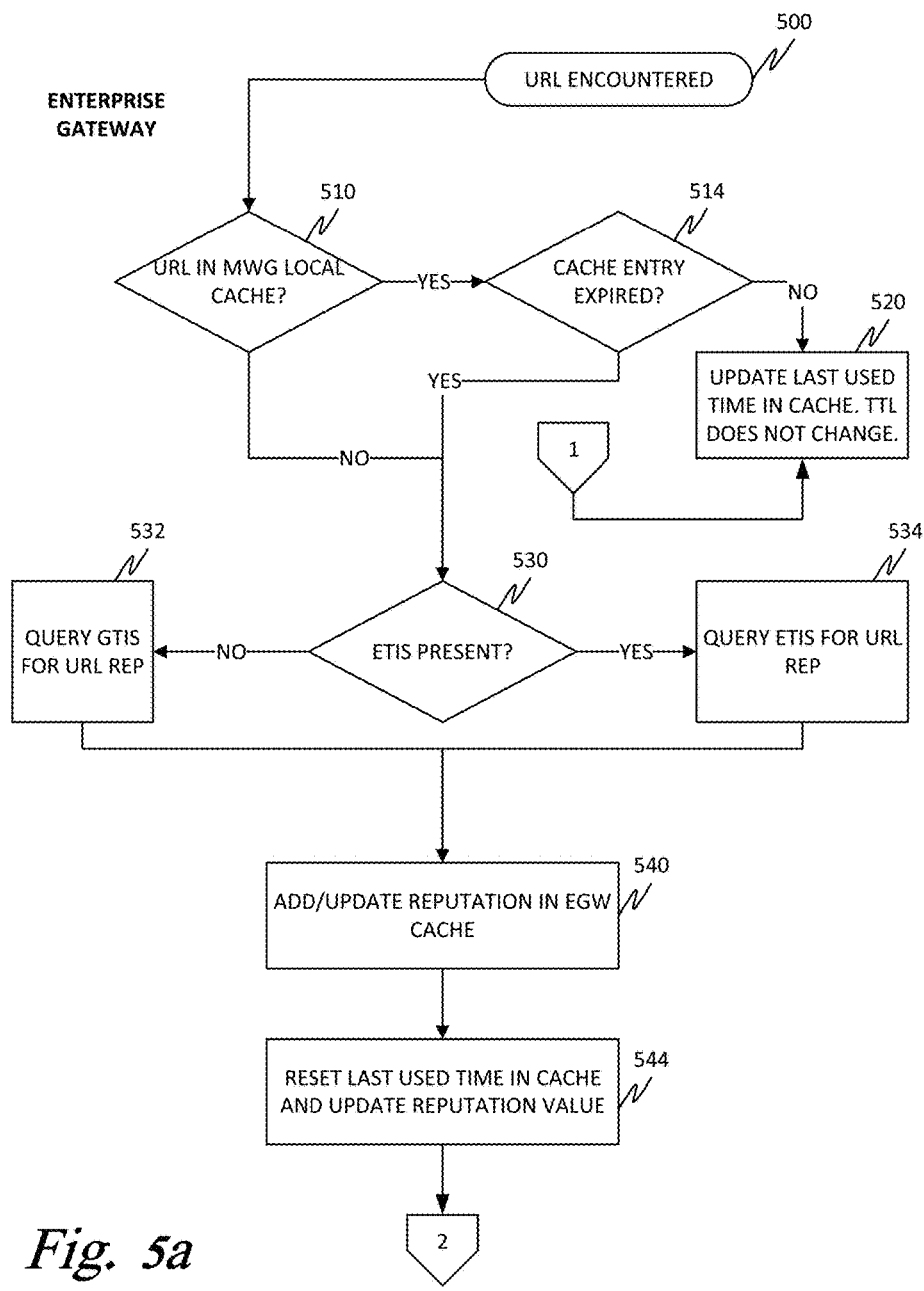
FIGS. 5a and 5b are a flow chart of an enterprise gateway (EGW) looking up a URL reputation according to one or more examples of the present specification.
Figure 5B:
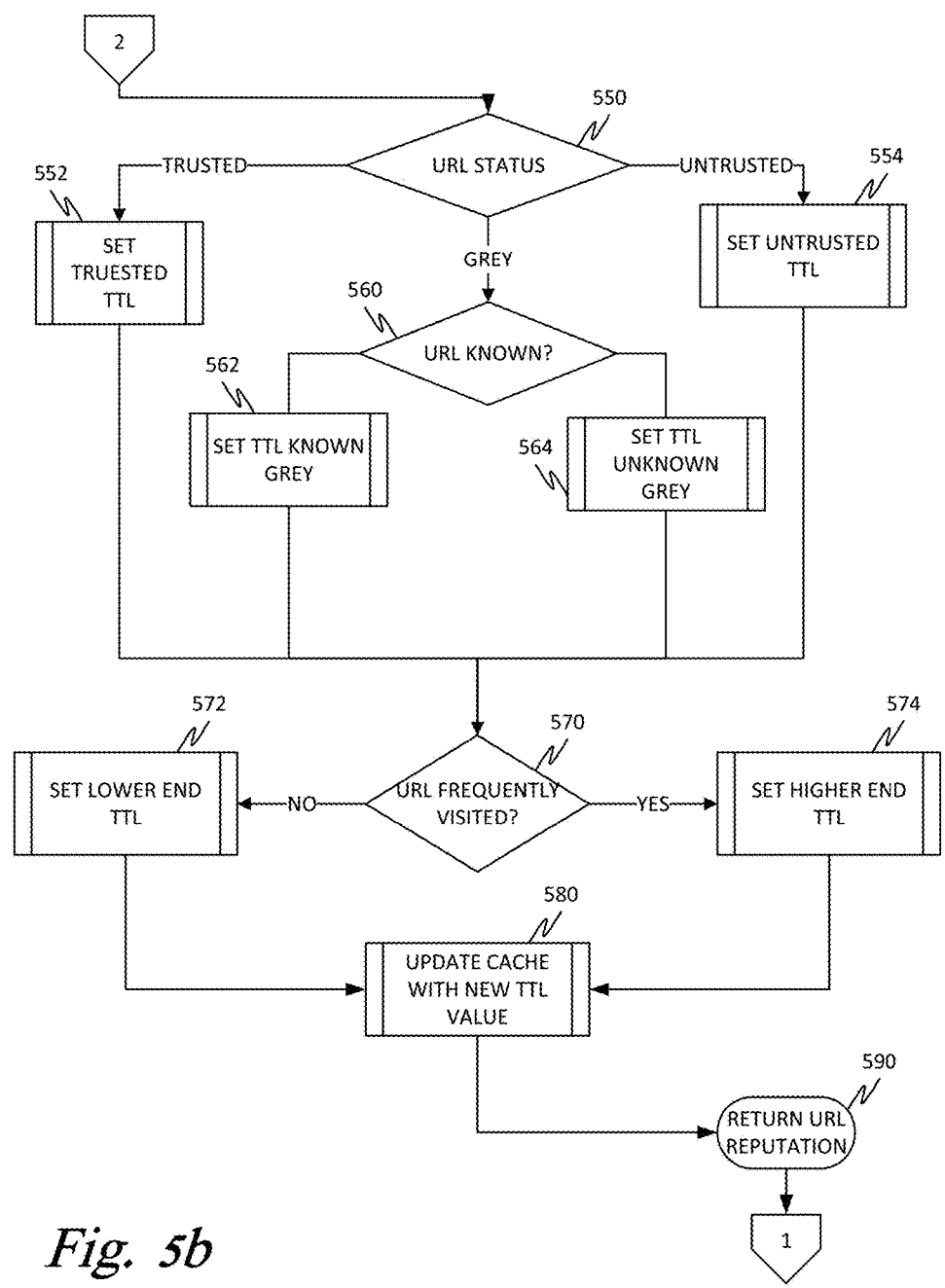

FIGS. 5A and 5B are a flowchart of a reputation client engine 326 handling reputations for URLs that it encounters.

In block 500, EGW 144 encounters the URL.

In block 510, EGW 144 checks to see whether there is a locally cached reputation for that URL.

If there is, then in block 514, EGW 144 checks see whether the entry has expired. If it has not, then in block 520, EGW 144 updates the last used time in cache. The TTL does not change in this case.

Returning to block 514 and to block 510, if the block entry has expired in if the cache entry has expired in block 514, or if there is no locally cached reputation in block 510, then in block 530, MGW 144 checks to see whether ETIS 146 is present.

If ETIS 146 is not present, then in block 532, EGW 144 may query G case 192 for a global URL reputation.

Returning to block 530, if ETIS 146 is present, then in block 534, EGW 142 queries ETIS 146 for a URL reputation.

Whether retrieved from ETIS 146 or GTIS 192, a new reputation entry has been received. Thus, in block 540, EGW 144 adds or updates the reputation in its own internal cache.

In block 544, EGW 144 resets the last used time in cache and updates the reputation value.

Following off page connector 2, and turning to FIG. 5B, in block 550, in one example, the URL may have a status selected from one of three broadly defined categories. Trusted ("white") URLs are those that are trusted to be beneficial for the enterprise. These should be allowed without any further interference. Untrusted ("black") URLs are URLs that are known to host bad content or to provide restricted information. Neutral ("gray") URLs are URLs that have not yet been fully characterized, and thus have not been assigned a status as trusted or untrusted.

If a URL is trusted, then in block 552, a TTL corresponding to the trusted status is set. Ranges for TTL's are described in more detail below.

If the URL is untrusted, then in block 554, an untrusted TTL is set.

In block 560, if the URL has a gray or "unknown" status, then reputation client engine 326 checks whether the URL is a known URL. If it is known, then in block 562, a TTL corresponding to known gray URLs is set.

If it is not known, then in block 564, a TTL corresponding to an unknown gray URLs is set.

The outputs of blocks 552, 554, 562, and 564, converge on decision block 570.

In decision block 570, reputation client engine 326 determines whether the URL is frequently visited. If the URL is frequently visited, then in block 574, the TTL is set to the higher end of the range for its appropriate category.

If the URL is not frequently visited, then in block 572, the TTL is set to the lower end of its range.

In block 580, the new TTL value is updated within the cache.

In block 590, reputation client engine 326 returns the URL reputation. Following off page connector 1 back to FIG. 5A, in block 520 reputation client engine 326 updates the last used time in cache. The TTL does not change.

Figure 6A:
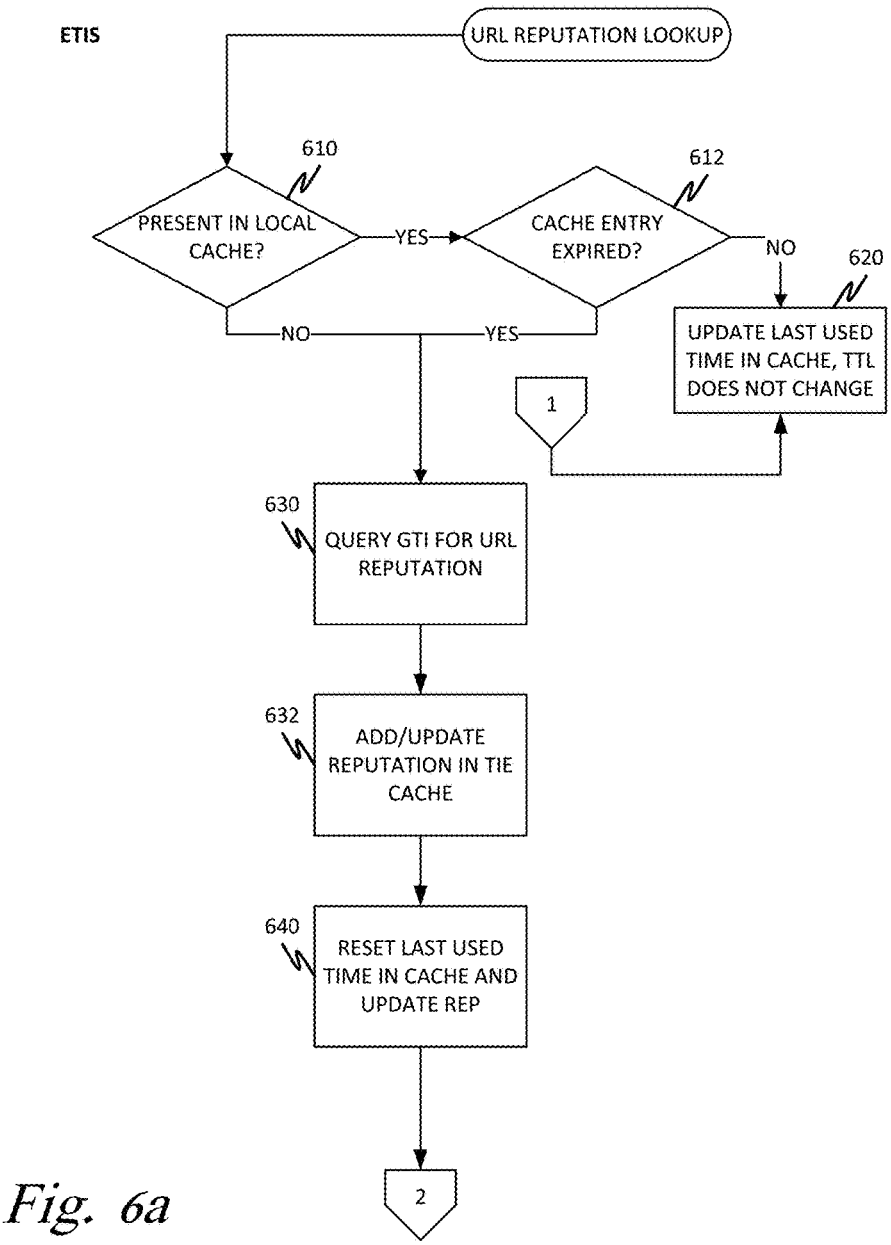
FIGS. 6a and 6b are a flow chart of an enterprise threat intelligence server (ETIS) updating a URL reputation according to one or more examples of the present specification.
Figure 6B:
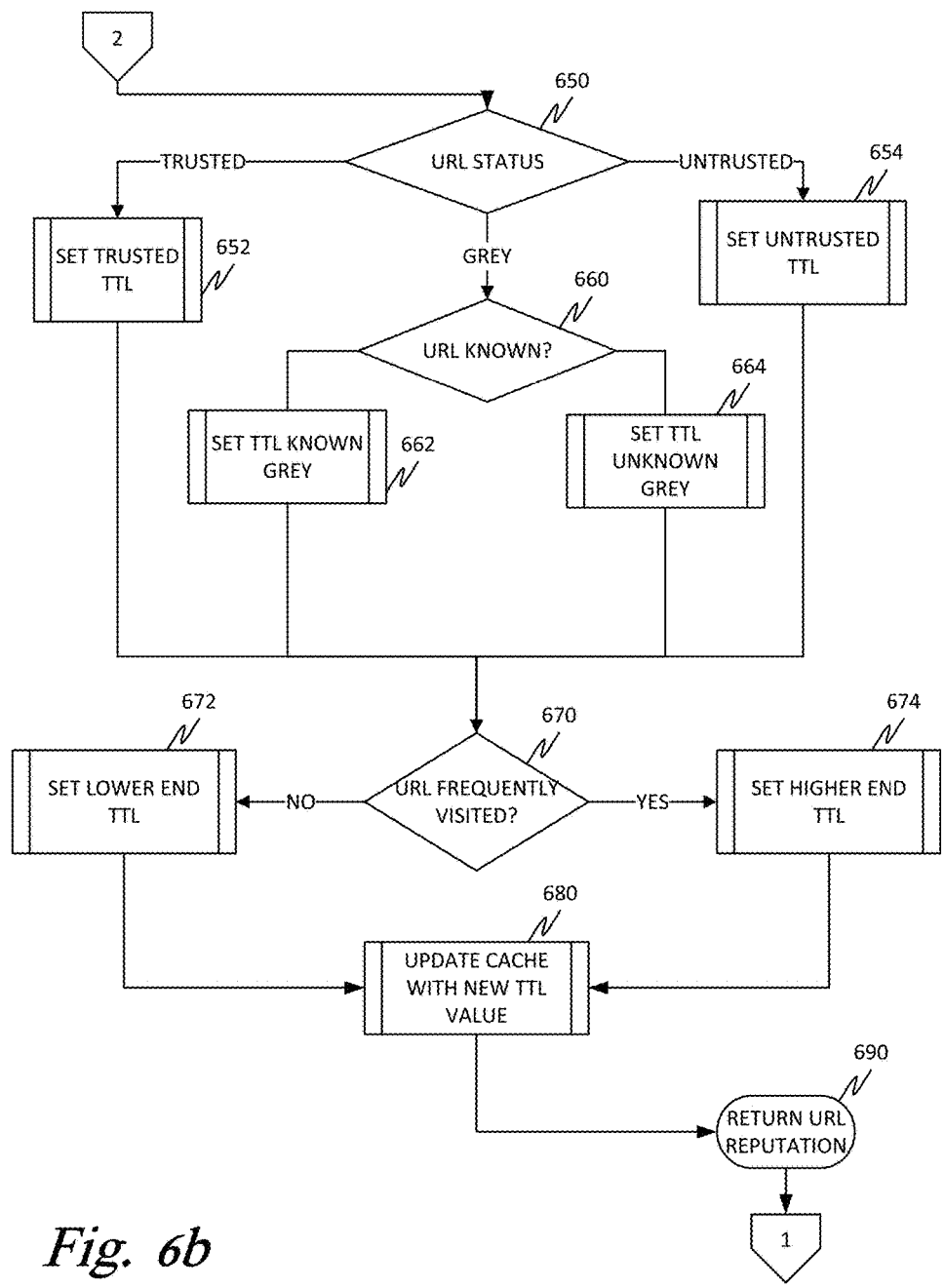

FIGS. 6A and 6B provide a flowchart of a method performed by a reputation server engine 324 of in ETIS 146. In block 600, reputation engine 324 receives a URL reputation request.

In block 610, ETIS 146 checks whether a reputation for the URL is present in its local cache. If so, then in block 612, reputation server engine 324 checks whether the entry has expired. If the entry has not expired, then in block 620, reputation server engine 324 updates the last used time in cache. The TTL does not change. Reputation server engine 324 may then report the URL to the requesting device.

Returning to decision block 610, if the URL does not have a reputation present in the local cache, or in block 612, if the entry has expired, then in block 630, ETIS 146 queries GTIS 192 for a URL reputation. In block 632, ETIS 146 receives a response from GTIS 192 and adds and updates the reputation in its local cache.

In block 640, reputation engine 324 resets the last used time in cache and updates the reputation. Following off page connector 2 to FIG. 6B, in block 650, reputation engine 324 checks the URL status.

In block 650, in one example, the URL may have a status selected from one of three broadly defined categories. Trusted ("white") URLs are those that are trusted to be beneficial for the enterprise. These should be allowed without any further interference. Untrusted ("black") URLs are URLs that are known to host bad content or to provide restricted information. Neutral ("gray") URLs are URLs that have not yet been fully characterized, and thus have not been assigned a status as trusted or untrusted.

If a URL is trusted, then in block 652, a TTL corresponding to the trusted status is set. Ranges for TTL's are described in more detail below.

If the URL is untrusted, then in block 654, an untrusted TTL is set.

In block 660, if the URL has a gray or "unknown" status, then reputation server engine 324 checks whether the URL is a known URL. If it is known, then in block 662, a TTL corresponding to known gray URLs is set.

If it is not known, then in block 664, a TTL corresponding to an unknown gray URLs is set.

The outputs of blocks 652, 654, 662, and 664, converge on decision block 670.

In decision block 670, reputation server engine 324 determines whether the URL is frequently visited. If the URL is frequently visited, then in block 674, the TTL is set to the higher end of the range for its appropriate category.

If the URL is not frequently visited, then in block 672, the TTL is set to the lower end of its range.

In block 680, the new TTL value is updated within the cache.

In block 690, reputation server engine 324 returns the URL reputation.

Following off page connector 1 back to FIG. 6A, in block 620 reputation server engine 324 updates the last used time in cache. The TTL does not change.

Figure 7:
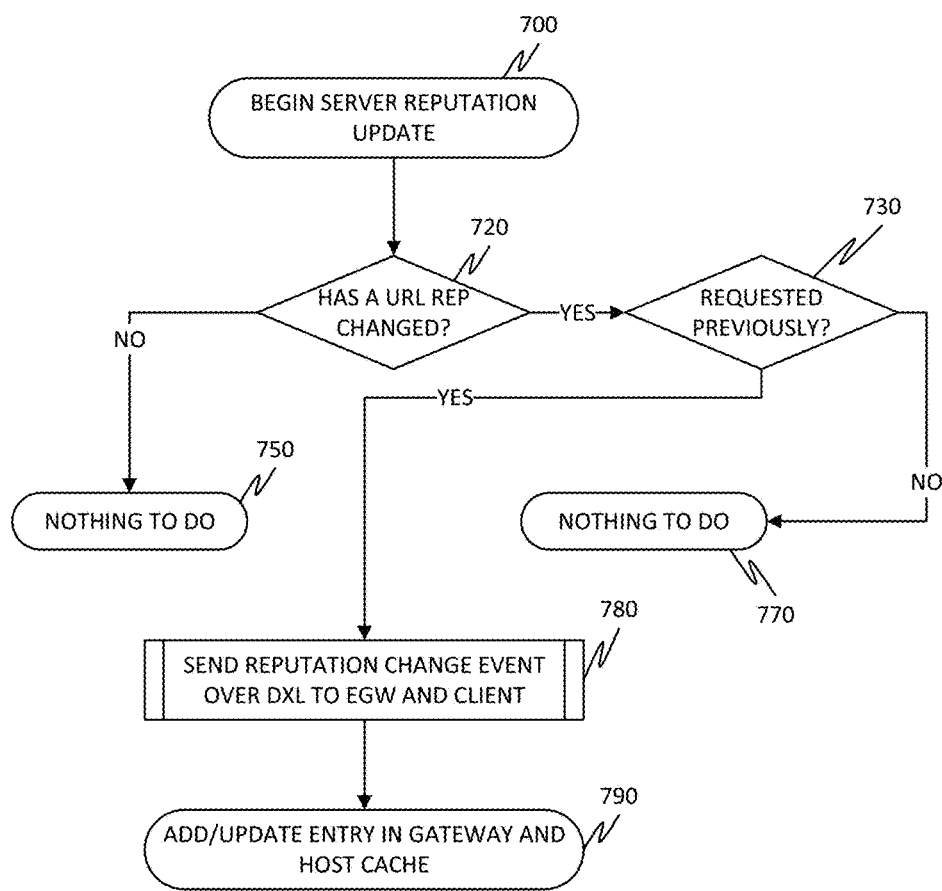
FIG. 7 is a flowchart of a reputation update workflow.

FIG. 7 is a flowchart of a reputation update workflow.

In block 700, reputation engine 324 begins a server reputation update. In decision block 720, reputation engine 324 determines whether the URL reputation has changed. If it has not, then in block 750 there is nothing to do.

If the reputation has changed, then in decision block 730, reputation engine 324 determines whether the URL reputation was requested previously.

If not, then in block 770, there is nothing to do. However, if it was requested previously, then in block 780, reputation engine 324 may send a reputation change event, for example over an enterprise service bus such as a data exchange layer (DXL), to EGW 144, as well as to client devices 110.

In block 790, reputation engine 324 adds or updates an entry in the gateway and host (client device) caches.

Note that according to the method of FIG. 7, reputation engine 324 publishes a URL reputation on the DXL, so that EGW 144 does not need to explicitly request a reputation every time encounters a URL. Rather, as long as the reputation has not expired, EGW 144 may continue to use its cache reputation. Once the reputation expires, EGW 144 may check for a new published reputation, or may expressly requests a reputation for the URL from ETIS 146.

Caching URL reputations as described herein improves performance in certain embodiments. For efficiency and scale, a cache on the host (client) or EGW 144 may be provided in addition to the cache on ETIS 146 itself. These two independent caches may help to minimize queries directed to ETIS 146 and those directed to GTIS 192.

In an embodiment, the caches have the following properties:

a. Each cache expires entries over periods of time that vary with the classification of the URL as well as the local prevalence of the URL.

b. Each cache only contains those entries that have been seen by that product.

c. Each cache performs 'lazy removal' of the cache entries, as necessary, i.e. an asynchronous garbage collection process removes expired entries as required. The frequency of the garbage collection process as well as the TTL ranges allocated per classification may depend on the degree of use of the cache and the load on the device. This frequency may also be made customer configurable.

d. The gateway 142 cache may support the ability to perform a bulk query for the top X (where X is a configurable number based on the size of its cache) most prevalent URL reputations in the local environment so that a potential cold-start impact of the cache can be significantly reduced.

e. The cache may be persisted across reboots.

f. The maximum size of the cache may be configurable between default and a customer configured size.

In an example, the timeout values in the cache are configured to allow the most prevalent URL reputations to be retained for a 3-4 day period at least to avoid a post-weekend rush when a significant number of devices come online again.

The host 110/gateway 144 cache may listen for any URL reputation change events on the DXL coming from ETIS 146 and update their cache entries with that information.

According to the method described herein, EGW 144 does not need to download and persist a local database of URL reputations. Rather, if the vast majority of queries (for example, >95%) hit the local database, then the cache will provide similar value after the initial "cold start" period where the cache has to be built up initially.

The effectiveness of the local cache may be enhanced by cooperating with GTIS 192 for providing information on which portion of the URL was cacheable and which URLs are not to be cached. This may come in the form of GTIS 192 responding to a query with a tree showing all relevant URLs. Alternately, a response may includes the number of bytes of the URL that can be cached, if any.

In an embodiment, gateway 144 looks at the local cache first for information that has been populated from the ETIS 146 that includes administrative overrides, reputation changes, etc. This cache may be updated out-of-band with information over DXL from ETIS 146. It is also pre-populated with the locally most prevalent URLs, with the number of these URLs depending on the size of the cache and the load on the gateway.

If no cache hits are found, EGW 144 may then look up the reputation in a local database. If the local DB does not contain a relevant reputation, EGW 144 queries ETIS 146 if it is present. Otherwise, it may query GTIS 192 via a REST API, for example.

In certain embodiments ETIS 146 publishes URL reputation change events on the DXL for other host and gateway products to consume and update their respective caches with this information. ETIS 146 may also support bulk URL queries to reduce latency.

ETIS 146 may also support a query for the top X URLs (for example, X=1000). This value may be configurable. This may help to alleviate any "cold start"/cache flush issues. An administrator may also specify a minimum (floor) prevalence value that must be met before the URLs are returned. This may result in fewer URLs being returned than the minimum number of reputations specified by the query.

In an example, the following data are stored in ETIS 146:

TABLE 1

URL Reputation Storage

| Category | Desired fields | Description | When to store |
|---|---|---|---|
| | Stripped URL (The URL is stored in its component parts, FQDN and entire URL) | For privacy reasons, strip params and auth. Only Scheme, Domain and Path. Configurable from EGW. | Whenever a URL object is stored (the portions that will be stored and duration of storage are described below). |
| | URL Web Reputation Score | The Reputation Score | Whenever a URL object is stored |
| | URL Category | The category for the URL | Whenever a URL object is stored |
| | HTTP Referrer | | Whenever a URL object is stored and data is available |
| | HTTP User-Agent | ex: "Mozilla/4.0 (compatible; MSIE 7.0; Windows NT 6.0)" | Whenever a URL object is stored and data is available |
| | Destination IPv4 or IPv6 | | Whenever a URL object is stored and data is available |
| | Root File Name | If file is a member of an archive, Root File Name contains the archive file name. | When an archive file is downloaded from a URL (must be stored with the URL) |
| | File Name | If member of an archive, this is the member file name including archive path, else it is just the name of the file. | When a file is downloaded from a URL (must be stored with the URL) |

TABLE 1-continued

URL Reputation Storage

| Category | Desired fields | Description | When to store |
|---|---|---|---|
| | MD5 of Root File Body | Empty if not an archive format. | When a non-archive file is downloaded from a URL (must be stored with the URL) |
| | MD5 of the File Body | If root is an archive, this is the MD5 of an embedded member file, else it is the MD5 hash of the downloaded file. | When an archive file is downloaded from a URL (must be stored with the URL) |
| | SHA-1 of the Root File Body | Empty if not an archive format. | When a non-archive file is downloaded from a URL (must be stored with the URL) |
| | SHA-1 of File Body | If root is an archive, this is the SHA-1 of an embedded member file, else it is the SHA-1 hash of the downloaded file. | When an archive file is downloaded from a URL (must be stored with the URL) |
| | SHA-256 of the Root File Body | Empty if not an archive format. | When a non-archive file is downloaded from a URL (must be stored with the URL) |
| | SHA-256 of File Body | If root is an archive, this is the SHA-256 of an embedded member file, else it is the SHA-256 hash of the downloaded file. | When an archive file is downloaded from a URL (must be stored with the URL) |
| | CRC32 of Announced Media Type | Content-Type from Server, like image/jpeg | When available |
| | CRC32 of Detected Media Type | Actual File Type determined, like application/executable, text/html, . . . | When available |
| | MD5 of the File Body | This is the hash of the file that was connecting to the URL/domain. | When a file (non-browser) is attempting to connect to a URL. |
| | Detection Names | ex: "BehavesLike.Win32.Sality.dr", or "TR/Agent.HF.30" (3rd-party needs Legal check). | When available |
| | Detection Scores | 0 (clean) . . . 100 (malicious) | When available |
| | Detection Components | GAM, 3rdParty, DLP, . . . | When available |
| | Detection Components DAT Version | ex: 7654 | When available |
| | Product Version | ex: "MWG 7.5.0" | When available |
| | Enterprise Client Machine Identifier | IP Address of Internal Endpoint | Only when associated with a downloaded file |
| | Enterprise Client User Identifier | Username of person logged into endpoint | Only when associated with a downloaded file |
| | SHA-1 hash of the public key of the SSL certificate corresponding to domain | | For HTTPS URLs, when available. |
| | SHA-1 hash of the public key of the parent certificate of the SSL certificate corresponding to domain | | For HTTPS URLs, when available. |

TABLE 1-continued

URL Reputation Storage

| Category | Desired fields | Description | When to store |
|---|---|---|---|
| | Destination SSL Certificate verification result | ex: Valid, Trusted, Self-Signed, Expired, . . . | For HTTPS URLs, when available. |

In an example, the complete URL is stored only for a short time (depending on the caching policy, which may vary based on classification and current load on ETIS 146) for the express purpose of caching the reputation for frequently queried objects. Longer term storage for complete URLs may only be necessary for administrative overrides, storing URL classification results from other products, and when a file has been downloaded from a specific URL. Outside of that, only sub-domain level data may need be stored for the express purpose of maintaining a local prevalence value for URL sub-domains. In an example, the TTL for sub-domain data does not exceed 90 days. This TTL may be configurable on ETIS 146.

Security administrator 150 may be able to set a reputation on a Domain, Sub-Domain, or URL level, by way of nonlimiting example. These may be resolved in order of specificity from most specific to least specific. Overrides may support wild carding, with (in one example) '*' resolving within a slash '/', and '**' resolving across slashes. The user interface may hide any complexities arising from this wild-carding to avoid confusion.

In an example, reputation values may qualitatively include the following:
 a. Known trusted
 b. Most likely trusted
 c. Unknown (effectively blocking reputation for this URL)
 d. Most likely malicious
 e. Known malicious
In example use case:
 a. Administrator 150 sets a known trusted reputation for example.com. All queries to example.com will resolve as known trusted.
 b. Administrator sets a most likely malicious reputation for example.com/someurl/*. All queries to www.example.com/someurl/* will resolve as most likely malicious.
 c. Considering both of the reputations above together, www.example.com/someotherurl/ will resolve as known trusted and www.somecompany.com/someurl/ will resolve as most likely malicious.

The administrator may also be able to set an SSL certificate reputation to one of the following values:
 a. Known trusted
 b. Most likely trusted
 c. Unknown
 d. Most likely malicious
 e. Known malicious
In an example use case:
 a. Administrator 150 sets an SSL certificate to known trusted. If a reputation consumer (such as EGW 144 or client 110) queries the URL, it will get the Administrator SSL certificate reputation in addition to the URL reputation. In the case of an unknown or weak URL reputation, the reputation consumer can trust the URL based on the SSL certificate.
 b. Administrator 150 sets an SSL certificate to known malicious. If a reputation consumer queries the URL, it will get the Administrator SSL certificate reputation in addition to the URL reputation. In the case of an unknown or weak URL reputation, the reputation consumer can block the URL based on the SSL certificate.

In an example, when a reputation consumer queries a URL reputation from ETIS 146, the DXL message includes the following, by way of nonlimiting example:
 a. Fully qualified URL (protocol, domain, path, etc)
 b. SSL certificate for URL (if available)
 c. File hash requesting the URL (if available)
 d. File being downloaded from the URL (if available)
 e. Referrer (if available)

ETIS 146 may respond with a list of URL reputations and categories. ETIS 146 may store and calculate these values if it is caching the reputation.

In an example, GTIS 192 provides scalar reputation mapping (0-100). This may represent the trust score for the reputation provider reported by ETIS 146. Mappings are provided below. Other data may include:
 a. Original GTIS URL reputation response (+/−127)
 b. GTIS URL category.
 c. GTIS URL GEO. This may only be available if the IP address is included in the request, or if it has been cached on ETIS 146.
 d. GTIS Domain reputation. This may be different from the URL reputation.
 e. GTIS URL Flags. This may be an unsigned 32 bit integer bit mask. This is currently used to indicate McAfee Secure. It is reported as reputation attribute JCM_ITEM_ID_GTI_URL_FLAGS.

Enterprise URL reputations may also be provided as a scalar score (0-100). This may be configured by security administrator 150. Other data may include:
 a. Enterprise URL Subdomain first seen. This is the date that the URL's subdomain was first seen in the enterprise (EPOCH).
 b. Enterprise URL Subdomain query count. This is the query count on the URLs subdomain
 c. Reputation aggregate for files downloaded from this URL (min, max, avg, count, last). This may be updated if a file reputation changes. In on embodiment, it is expected that the number of URLs with file associations will be low compared to the total number of URLs.
 d. URL Referrers initial reputation aggregate (min, max, avg, count, last). Note that referrer reputation URL does not require updating after initial calculation.

In addition, if the original query included a certificate, the DXL message response may provide the certificate reputation:
 a. GTI SSL Certificate reputation (if available). This is the 0-100 scoring of a reputation trust score. ETIS 146 may query the certificate reputation if it does not currently have it.

b. Enterprise SSL Certificate reputation (if available). This is the 0-100 scoring of a reputation trust score. If it is not set, return 0.

In an example, a reputation query and randomized asynchronous reputation queries may contain the following fields:
  a. ETIS Product Info
  b. Client Product Info
  c. URL query info
    i. Fully qualified URL (protocol, domain, path, etc)
    ii. SSL certificate for URL (if available)
    iii. File hash requesting the URL (if available)
    iv. File being downloaded from the URL (if available)
    v. Referrer (if available)
  d. Enterprise URL reputation data
    i. Enterprise URL first seen
    ii. Enterprise URL query count
    iii. Number of files downloaded from this URL
    iv. Number of referrers for this URL
    v. Average reputation of files communicating with this URL.
    vi. Average reputation of referrers Any cached URL reputation which is being re-queried may include the following data.
  a. ETIS Product Info
  b. URL query info
    i. Fully qualified URL (protocol, domain, path, etc)
    ii. SSL certificate for URL (if available)
  c. Enterprise URL reputation data
    i. Enterprise URL first seen
    ii. Enterprise URL query count
    iii. Number of files downloaded from this URL
    iv. Number of referrers for this URL
    v. Average reputation of referrers
    vi. Enterprise override match
    vii. Enterprise override reputation The URL reputation from GTIS 192 may provide a +/−127 reputation score. This may then be mapped to a reputation score that can be returned by the ETIS. Equivalencies may include the following:
  a. −127=100
  b. −126=99 (known trusted)
  c. −125--21=85→98 (most likely trusted)
  d. −20-14=70→84 (might be trusted)
  e. 16-22=50-69 (known unknown)
  f. 15=0 (not set/unknown unknown)
  g. 23-29=31-49 (known unknown)
  h. 30-49=16-30 (might be malicious)
  i. 50-126=2-15 (most likely malicious)
  j. 127=1 (malicious)

AS described above, ETIS 146 may maintain a TTL for URL reputations and keep the GTIS-supplied reputation up to date. Examples of ETIS TTLs include the following:

| Reputation | Reputation TTL Ranges (hours) |
|---|---|
| Known Trusted | 72-96 |
| Most Likely Trusted | 48-96 |
| Might be Trusted | 24-72 |
| Known Unknown | 12-36 |
| Unknown Unknown | 1-12 |
| Might be Malicious | 12-36 |
| Most Likely Malicious | 24-48 |
| Known Malicious | 36-50 |

Specific values within these ranges may be selected based on local prevalence (higher prevalence=higher range of timeout). It is possible to have an accelerated expiry (this expiry will still follow the order of precedence based on the least TTL expiring first) of these entries depending on the load on the system. Also, the exceptions noted in the URL storage section will apply.

If a URL reputation changes, a reputation change notification may be sent, for example over DXL. If a URL reputation changes and that URL is associated to a file, and the aggregate attributes for the file reputation change, then a reputation change notification should be sent for that file if it does not have a GTI reputation of known trusted or an enterprise reputation set.

In an example, ETIS 146 supports taking IOCs as inputs and correlates the URL data present with the data in the IoC (for example, the file→URL, URL→file and URL&file→device relations).

ETIS 146 may also be to query third-party tools for URLs, store the resulting reputation data, and make these available to products integrating with ETIS 146 as well as to administrators for visualization.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

The particular embodiments of the present disclosure may readily include a system on chip (SOC) central processing unit (CPU) package. An SOC represents an integrated circuit (IC) that integrates components of a computer or other electronic system into a single chip. It may contain digital, analog, mixed-signal, and radio frequency functions: all of which may be provided on a single chip substrate. Other embodiments may include a multi-chip-module (MCM), with a plurality of chips located within a single electronic package and configured to interact closely with each other through the electronic package. In various other embodiments, the digital signal processing functionalities may be implemented in one or more silicon cores in Application Specific Integrated Circuits (ASICs), Field Programmable Gate Arrays (FPGAs), and other semiconductor chips.

Additionally, some of the components associated with described microprocessors may be removed, or otherwise consolidated. In a general sense, the arrangements depicted in the figures may be more logical in their representations, whereas a physical architecture may include various permutations, combinations, and/or hybrids of these elements. It is imperative to note that countless possible design configurations can be used to achieve the operational objectives outlined herein. Accordingly, the associated infrastructure has a myriad of substitute arrangements, design choices, device possibilities, hardware configurations, software implementations, equipment options, etc.

Any suitably-configured processor component can execute any type of instructions associated with the data to achieve the operations detailed herein. Any processor disclosed herein could transform an element or an article (for example, data) from one state or thing to another state or thing. In another example, some activities outlined herein may be implemented with fixed logic or programmable logic (for example, software and/or computer instructions executed by a processor) and the elements identified herein could be some type of a programmable processor, programmable digital logic (for example, a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof. In operation, processors may store information in any suitable type of non-transitory storage medium (for example, random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. Further, the information being tracked, sent, received, or stored in a processor could be provided in any database, register, table, cache, queue, control list, or storage structure, based on particular needs and implementations, all of which could be referenced in any suitable timeframe. Any of the memory items discussed herein should be construed as being encompassed within the broad term 'memory.'

Computer program logic implementing all or part of the functionality described herein is embodied in various forms, including, but in no way limited to, a source code form, a computer executable form, and various intermediate forms (for example, forms generated by an assembler, compiler, linker, or locator). In an example, source code includes a series of computer program instructions implemented in various programming languages, such as an object code, an assembly language, or a high-level language such as OpenCL, Fortran, C, C++, JAVA, or HTML for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

In one example embodiment, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In another example embodiment, the electrical circuits of the FIGURES may be implemented as stand-alone modules (e.g., a device with associated components and circuitry configured to perform a specific application or function) or implemented as plug-in modules into application specific hardware of electronic devices.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the FIGURES may be combined in various possible configurations, all of which are clearly within the broad scope of this specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 (pre-AIA) or paragraph (f) of the same section (poast-AIA), as it exists on the date of the filing hereof unless the words "means for" or "steps for" are specifically used in the particular claims; and (b) does not intend, by any statement in the specification, to limit this disclosure in any way that is not otherwise reflected in the appended claims.

Example Implementations

There is disclosed in one example, a computing apparatus configured to operate as an enterprise threat intelligence server, comprising: a network interface for configured to communicatively couple to a network; and one or more logic elements comprising a reputation engine, operable for: receiving a first uniform resource locator (URL) identifier; determining that a first URL identified by the first URL identifier has an unknown enterprise reputation; and establishing a baseline reputation for the URL.

There is further disclosed an example wherein establishing the baseline reputation comprises querying a global threat intelligence server for a global reputation of the first URL.

There is further disclosed an example wherein the reputation engine is further operable for: receiving a response from the external threat intelligence server that the first URL has an unknown global reputation; and assigning the first URL a reputation as suspicious.

There is further disclosed an example wherein the reputation engine is further operable for: receiving a response from the global threat intelligence server that the first URL has a known global reputation; and generating an enterprise reputation for the first URL based at least in part on the known global reputation.

There is further disclosed an example wherein the reputation engine is further operable for querying an enterprise gateway for information about the first URL, and for generating an enterprise reputation for the first URL based at least in part on the information about the first URL.

There is further disclosed an example wherein the reputation engine is further operable for submitting the first URL for sandbox analysis, receiving sandbox analysis results, and generating an enterprise reputation for the first URL based at least in part on the sandbox analysis.

There is further disclosed an example wherein the reputation comprises a second URL identifier, an age, a reputation, prevelance, and metadata.

There is further disclosed an example wherein the second URL identifier includes the first URL itself or a hash of the first URL.

There is further disclosed an example wherein the reputation engine is further operable for: determining that the URL has an existing enterprise reputation; and acting on the existing enterprise reputation.

There is further disclosed an example wherein the reputation engine is further operable for: determining that a network object with a known reputation has an association with the first URL; and assigning the first URL a reputation based at least in part on the known reputation of the network object.

There is further disclosed an example wherein assigning the first URL a reputation based at least in part on the known reputation of the network object comprises: determining that the known reputation of the network object is an untrusted reputation; determining that the URL has low prevelance within the enterprise; and assigning the URL an untrusted reputation.

There is further disclosed an example wherein determining that a network object with a known reputation has an association with the first URL comprises determining that the network object was received from the first URL.

There is further disclosed an example wherein determining that a network object with a known reputation has an association with the first URL comprises determining that the network object contacts the first URL.

There is further disclosed an example of one or more tangible, non-transitory computer-readable storage mediums having stored thereon executable instructions for instructing one or more processors for providing a reputation engine operable for performing any or all of the operations of the preceding examples.

There is further disclosed an example of a method of providing a reputation engine comprising performing any or all of the operations of the preceding examples.

There is further disclosed an example of an apparatus comprising means for performing the method.

There is further disclosed an example wherein the means comprise a processor and a memory.

There is further disclosed an example wherein the means comprise one or more tangible, non-transitory computer-readable storage mediums.

There is further disclosed an example wherein the apparatus is a computing device.

What is claimed is:

1. A computing apparatus configured to operate as an enterprise threat intelligence server, comprising:
   a network interface configured to communicatively couple to a network of an enterprise and to a global threat intelligence service (GTIS); and
   one or more logic elements comprising a reputation engine, operable for:
      receiving a first reputation request for a uniform resource locator (URL) identifier;
      querying the GTIS for a global reputation for a first URL identified by the first URL identifier;
      based at least in part on the global reputation, determining that the first URL has an unknown enterprise reputation, wherein the enterprise reputation is specific to the enterprise;
      establishing an enterprise reputation for the first URL;
      setting an expiry for the enterprise reputation, wherein the expiry is based at least partly on a frequency the URL is visited and wherein a time-to-live (TTL) of the expiry is directly proportional to the frequency; and
      caching the enterprise reputation for the duration of the expiry.

2. The computing apparatus of claim 1, wherein the reputation engine is further operable for:
   receiving a response from the enterprise threat intelligence server that the first URL has an unknown global reputation; and
   assigning the first URL a reputation as suspicious.

3. The computing apparatus of claim 1, wherein the reputation engine is further operable for:
   receiving a response from the enterprise threat intelligence server that the first URL has a known global reputation; and
   generating an enterprise reputation for the first URL based at least in part on the known global reputation.

4. The computing apparatus of claim 1, wherein the reputation engine is further operable for querying an enterprise gateway for information about the first URL, and for generating an enterprise reputation for the first URL based at least in part on the information about the first URL.

5. The computing apparatus of claim 1, wherein the reputation engine is further operable for submitting the first URL for sandbox analysis, receiving sandbox analysis results, and generating an enterprise reputation for the first URL based at least in part on the sandbox analysis.

6. The computing apparatus of claim 1, wherein the enterprise reputation comprises a second URL identifier, an age, a reputation, prevalence, and metadata.

7. The computing apparatus of claim 6, wherein the second URL identifier includes the first URL itself or a hash of the first URL.

8. The computing apparatus of claim 1, wherein the reputation engine is further operable for:
   determining that the first URL has an existing enterprise reputation; and
   acting on the existing enterprise reputation.

9. The computing apparatus of claim 1, wherein the reputation engine is further operable for:
   determining that a network object with a known reputation has an association with the first URL; and
   assigning the first URL a reputation based at least in part on the known reputation of the network object.

10. The computing apparatus of claim 9, wherein assigning the first URL a reputation based at least in part on the known reputation of the network object comprises:
    determining that the known reputation of the network object is an untrusted reputation;
    determining that the URL has low prevalence within the enterprise; and
    assigning the URL an untrusted reputation.

11. The computing apparatus of claim 9, wherein determining that a network object with a known reputation has an association with the first URL comprises determining that the network object was received from the first URL.

12. The computing apparatus of claim 9, wherein determining that a network object with a known reputation has an association with the first URL comprises determining that the network object contacts the first URL.

13. One or more tangible, non-transitory computer-readable storage mediums having stored thereon executable instructions for providing a reputation engine operable for:
communicatively coupling to a network of an enterprise and to a global threat intelligence service (GTIS) via a network interface;
receiving a first reputation request for a uniform resource locator (URL) identifier;
querying the GTIS for a global reputation for a first URL identified by the first URL identifier;
based at least in part on the global reputation, determining that the first URL has an unknown enterprise reputation, wherein the enterprise reputation is specific to the enterprise;
establishing an enterprise reputation for the first URL;
setting an expiry for the enterprise reputation, wherein the expiry is based at least partly on a frequency the URL is visited and wherein a time-to-live (TTL) of the expiry is directly proportional to the frequency; and
caching the enterprise reputation for the duration of the expiry.

14. The one or more tangible, non-transitory computer-readable mediums of claim 13, wherein the reputation engine is further operable for:
receiving a response from the global threat intelligence server that the first URL has an unknown global reputation; and
assigning the first URL a reputation as suspicious.

15. The one or more tangible, non-transitory computer-readable mediums of claim 13, wherein the reputation engine is further operable for:
receiving a response from the global threat intelligence server that the first URL has a known global reputation; and
generating an enterprise reputation for the first URL based at least in part on the known global reputation.

16. The one or more tangible, non-transitory computer-readable mediums of claim 13, wherein the reputation engine is further operable for querying an enterprise gateway for information about the first URL, and for generating an enterprise reputation for the first URL based at least in part on the information about the first URL.

17. The one or more tangible, non-transitory computer-readable mediums of claim 13, wherein the reputation engine is further operable for submitting the first URL for sandbox analysis, receiving sandbox analysis results, and generating an enterprise reputation for the first URL based at least in part on the sandbox analysis.

18. The one or more tangible, non-transitory computer-readable mediums of claim 13, wherein the reputation engine is further operable for:
determining that the first URL has an existing enterprise reputation; and
acting on the existing enterprise reputation.

19. The one or more tangible, non-transitory computer-readable mediums of claim 13, wherein the reputation engine is further operable for:
determining that a network object with a known reputation has an association with the first URL; and
assigning the first URL a reputation based at least in part on the known reputation of the network object.

20. The one or more tangible, non-transitory computer-readable mediums of claim 13, wherein the reputation engine is further operable for assigning the first URL a reputation based at least in part on a known reputation of a network object, comprising:
determining that the known reputation of the network object is an untrusted reputation;
determining that the URL has low prevalence within the enterprise; and
assigning the URL an untrusted reputation.

21. The one or more tangible, non-transitory computer-readable mediums of claim 13, wherein the reputation engine is further operable for determining that a network object with a known reputation has an association with the first URL, comprising determining that the network object was received from the first URL or contacts the first URL.

22. A computer-implemented method of providing a reputation engine operable for:
communicatively coupling to a network of an enterprise and to a global threat intelligence service (GTIS) via a network interface;
receiving a first reputation request for a uniform resource locator (URL) identifier via a network interface;
querying the GTIS for a global reputation for a first URL identified by the first URL identifier;
based at least in part on the global reputation, determining that the first URL has an unknown enterprise reputation, wherein the enterprise reputation is specific to the enterprise; and
establishing an enterprise baseline reputation for the URL;
setting an expiry for the enterprise reputation, wherein the expiry is based at least partly on a frequency the URL is visited and wherein a time-to-live (TTL) of the expiry is directly proportional to the frequency; and
caching the enterprise reputation for the duration of the expiry.

23. The computing apparatus of claim 1, wherein the reputation engine is further operable for:
receiving a second request for the URL identifier;
determining that the cached entry for the URL identifier has expired; and
re-querying the GTIS for the global reputation of the first URL.

24. The one or more tangible, non-transitory computer-readable mediums of claim 13, wherein the reputation engine is further operable for:
receiving a second request for the URL identifier;
determining that the cached entry for the URL identifier has expired; and
re-querying the GTIS for the global reputation of the first URL.

25. The computer-implemented method of claim 22, further comprising:
receiving a second request for the URL identifier;
determining that the cached entry for the URL identifier has expired; and
re-querying the GTIS for the global reputation of the first URL.

* * * * *